Patented June 30, 1936

2,046,145

UNITED STATES PATENT OFFICE 2,046,145

KETONE CONDENSATION PRODUCTS

Herrick R. Arnold, Elmhurst, Del., assignor to E. I. du Pont de Nemours & Company, Wilmington, Del., a corporation of Delaware No Drawing. Application June 30, 1934, Serial No. 733,242

18 Claims. (Cl. 260—134)

This invention relates to a process for the manufacture of ketones and more particularly to a process for producing higher ketones by the catalytic dehydrogenation of secondary aliphatic and cyclic alcohols.

The dehydrogenation of secondary alcohols to the corresponding ketones is readily accomplished catalytically. Methyl ketones obtained in this manner from secondary methyl carbinols, under suitable conditions undergo condensation with the elimination of water to yield products of varying degrees of condensation. For example in the condensation of acetone, these products consist partly of hydrocarbons such as mesitylene, and partly of unsaturated ketones such as mesityl oxide and phorone. Similarly cylohexanone may undergo condensation to cyclohexylidine cyclohexanone. These unsaturated ketone condensation products may furthermore be readily hydrogenated to the corresponding saturated ketones.

It is an object of this invention to provide a process for the production of higher ketones from secondary aliphatic and cyclic alcohols, and more particularly to provide a catalytic process whereby secondary methyl carbinols and cyclic alcohols may be converted directly by a single-step process into saturated ketones having a higher number of carbon atoms. Other objects and advantages will be apparent in the following specification.

In general the above objects are accomplished by the following invention which consists in bringing the vapors of secondary methyl carbinols or cyclic alcohols into contact for a suitable period of time with catalysts capable of simultaneously dehydrogenating the alcohol, causing the condensation of the resultant ketone, and hydrogenating the unsaturated ketone condensation products to saturated ketones.

The following examples are illustrative of the application of this invention and are in no way intended as limitations thereof.

Example 1

A catalyst consisting of a mixture of the chromites of zinc, copper and cadmium in the mole ratio of 82.5:10.0:7.5 respectively was prepared according to the method described in the application of W. A. Lazier, U. S. Serial No. 470,238 and used in the form of 8–14 mesh granules for the dehydrogenation of isopropanol in the vapor phase. 97.6% dehydrogenation of isopropanol was obtained by vaporizing and pre-heating to 325° C. 100 cc. of isopropanol per hour and passing the vapor over 25 cc. of the catlyst described above at 360° C. and a pressure of 100 lbs./sq. in. These conditions gave a time of contact of vapor with catalyst of 8.8 seconds. By condensing the vapors issuing from the reaction chamber there was obtained a mixture of liquid products containing 2.4% unchanged isopropanol, 29.5% acetone, 31.4% methyl isobutyl ketone, 15.7% di-isobutyl ketone, 7.8% of a mixture of unidentified high-boiling oils and 13.3% of water.

Example 2

98.7% dehydrogenation of isopropanol per pass was obtained by vaporizing and pre-heating to 325–350° C., 12.5 cc. of isopropanol per hour and passing the vapors at 360° C. and atmospheric pressure over 25 cc. of the catalyst used in Example 1. The time of contact of vapor with catalyst was 10.5 seconds. By condensing the reaction vapors there was obtained a liquid product containing 1.2% unchanged isopropanol, 30.5% acetone, 21.6% methyl isobutyl ketone, 22.9% of di-isobutyl ketone, 15.2% of hydrocarbons and high boiling oils, and 8.9% of water.

Example 2—A

By way of indicating the important effect of time of contact on yields of higher ketones a similar experiment was carried out under exactly the same conditions as in Example 2 except that 250 cc. of isopropanol was vaporized per hour and passed over 25 cc. of the catalyst, giving a time of contact of only 0.53 second. 98.6% of the alcohol was dehydrogenated, but the liquid products contained 76.8% of acetone and only 13% and 4.6% respectively of methyl isobutyl ketone and di-isobutyl ketone with no high-boiling fraction and only 4% of water.

Example 3

A catalyst was prepared by fusing a mixture of 1395 g. of copper oxide and 101 g. of magnesium oxide, crushing the fused mixture to 8–14 mesh granules and reducing for 18 hours at 300–350° C. in a stream of reducing gas consisting of 20% hydrogen and 80% nitrogen. By vaporizing and pre-heating to 325–350° C., 100 cc. of isopropanol per hour and passing the vapors over 25 cc. of this catalyst under a pressure of 150 lbs./sq. in. at 360° C., a time of contact of vapor with catalyst of 13.2 seconds was obtained. 90% dehydrogenation of the alcohol occurred per pass yielding a liquid product consisting of 10% isopropanol 59% acetone, 20% methyl isobutyl ketone, 5.7% di-isobutyl ketone, 1.6% high-boiling oil, and 4.1% water.

Example 4

As an example of the importance of using catalysts capable of simultaneous hydrogenation and dehydrogenation of zinc oxide, which is known to be active for dehydrogenation of alcohols, but substantially inactive toward hydrogenation of olefin bonds, was prepared in the following manner. Zinc oxalate was precipitated by the addition of 250 g. of ammonium oxalate dissolved in 1 liter of water to an equal volume of zinc nitrate solution containing the equivalent of 15 g. ZnO per 100 cc. After washing and drying the precipitate it was decomposed to the oxide by igniting to constant weight at 400° C. When used for the dehydrogenation of isopropanol to yield higher ketones under exactly the same conditions as described in Example 3, 80% of the alcohol was dehydrogenated per pass to yield a liquid mixture containing 20% isopropanol, 62% acetone, 6% mesityl oxide, and only 3.0% of a mixture of higher ketones, the remainder being lower-boiling hydrocarbon and water.

Example 5

160 cc. of secondary butanol was vaporized per hour and passed over 25 cc. of the catalyst described in Example 1 at 366° C., 100 lbs. pressure per sq. in., and a time of contact of 6.5 seconds. 82% of the alcohol was dehydrogenated per pass yielding a liquid condensate containing 18% unchanged secondary butanol, 60% methyl ethyl ketone, 19% of methyl-3-heptanone-5 (ethyl-act-amul ketone) and 3.0% of water.

Example 5—A

Under similar conditions as Example 5 except at a pressure of 500 lbs./sq. in. giving a time of contact of 32.3 seconds, 77% of the alcohol was dehydrogenated per pass yielding a liquid condensate containing 23% unchanged alcohol, 47.6% methyl-ethyl ketone and 25.5% methyl-3-heptanone-5, and 3.9% of water and hydrocarbons.

Example 6

Cyclohexanol was vaporized at the rate of 100 cc. per hour and passed over 25 cc. of the catalyst described in Example 1. At a temperature of 390° C. and a pressure of 250 lbs./sq. in., giving a time of contact of alcohol vapor with catalyst of 28.5 seconds. 87% of the cyclohexanol was dehydrogenated per pass yielding a liquid condensate which contained 13.3% unchanged cyclohexanol, 1.9% of a low-boiling hydrocarbon fraction consisting principally of hexane and cyclohexane, 27.3% of cyclohexanone, 6.5% of water and 51.1% of a crude mixture of high-boiling oil which contained 75–80% cyclohexyl-cyclohexanone, the remainder of the fraction consisting principally of higher condensation products which were not identified.

Example 6—A

Under conditions similar to Example 6 but carried out at 360° and 85 lbs. pressure, giving a time of contact of approximately 10 seconds, 85% of the cyclohexanol was dehydrogenated per pass yielding a liquid condensate which contained 15% unchanged cyclohexanol, 2.1% of low-boiling hydrocarbon, 39.5% of cyclohexanone, 4.3% of water and 39.1% of crude cyclohexyl-cyclohexanone having about the same composition as described above.

The critical factors involved in the formation of higher ketones from secondary alcohols by catalytic dehydrogenation are, (a) the catalyst, (b) time of contact of alcohol vapors with the catalyst, and (c) the structure of the alcohol.

Dehydrogenation catalysts generally, such as the oxides or salts of copper, silver, zinc, cadmium, iron, cobalt, or nickel, may be used, but I prefer to use a catalyst including one or more dehydrogenating elements and one or more metal oxides of dehydrating characteristics such as the oxides of chromium, thorium, vanadium, tungsten, molybdenum, or uranium. Preferably the dehydrogenating elements are in the combined states, for example, in the form of the oxides, or better, in the form of a chemical compound with a dehydrating metallic oxide. Suitable catalysts of this type, and methods for their preparation, are referred to in Lazier's U. S. Patents 1,746,782, 1,746,983 and 1,857,921.

Secondary alcohols which do not contain a methyl group directly attached to the carbinol group are unsuitable for this process since their ketones do not undergo condensation to unsaturated higher ketones. Any secondary methyl carbinol however, such as isopropanol, secondary butanol, methyl isobutyl carbinol, and cyclic alcohols such as cyclohexanol may be used.

The most critical factor in determining the production of higher ketone condensation products is the time of contact of the alcohol vapors with the catalyst. Equilibrium is easily reached in the dehydrogenation of secondary alcohols to the corresponding ketones even at very short time of contact, but in order to obtain practical yields of higher ketones it is necessary that the reactants remain in the catalytic zone sufficiently long to allow the slower ketone condensation reaction to occur. On the other hand, however, too long a time of contact may cause condensation to proceed too far resulting in the formation of undesirable hydrocarbons and polymers as well as decomposition products.

The choice of a suitable time of contact is dependent somewhat upon economic considerations. For example if it is desired to make cyclohexanone as well as cyclohexylcyclohexanone it may be advantageous to operate at a much shorter time of contact than would be economical if the latter product were the only one desired. Again, the time of contact selected will be determined somewhat by the particular alcohol to be dehydrogenated. In general the range of time of contact for any alcohol should be not longer than 50 seconds. The preferred range is from 6 to 20 seconds for most secondary aliphatic alcohols, and 20–40 seconds for cyclic alcohols.

Time of contact in seconds, of reactant vapors with catalyst is given by the following equation:

$$T.C. = \frac{982.8P}{ST}$$

where T.C.=time of contact in seconds
P=pressure in atmospheres
T=absolute temperature
S=gaseous space velocity $\times$ $10^{-3}$ (at 0° C.)

The production of higher ketones is independent of pressure which is used only as a means for obtaining a larger space-time yield for a given time of contact. Pressures varying from atmospheric to 3000 lbs. per square inch may be used provided other conditions are so adjusted as to obtain the proper time of contact.

The temperature employed in this process will vary somewhat depending upon the temperature of activity of the catalyst, and the stability of the reactants and reaction products. The temperature may vary from 200° to 500° C., but when using the preferred catalysts consisting of chromites or mixtures of chromites the temperature should be at least 325° C. in order to obtain the maximum catalytic activity. In most cases 350–375° C. constitutes the most suitable range.

Ketones have a particularly wide range of application as solvents, plasticizers, blending agents, wax substitutes, perfume ingredients, detergents, and numerous other uses. Thus methyl isobutyl ketone, for example, is an excellent solvent for pyroxylin. The process embodied in this invention has therefore an important application in the preparation of a wide variety of useful products.

The principal advantage of this invention is that it provides a simple single step catalytic process for the direct conversion of secondary aliphatic and cyclic alcohols to useful ketones having a higher number of carbon atoms. It embodies in this single step three processes which would otherwise be accomplished separately, namely, hydrogenation of a secondary alcohol to the corresponding ketone, condensation of such ketone to higher unsaturated ketones, and hydrogenation of the unsaturated to saturated ketones. Moreover, it makes possible the preparation of such higher ketones from raw materials which are ordinarily cheaper than those required by other processes. Other advantages will be apparent.

As many apparently and widely different embodiments of this invention may be made without departing from the spirit and scope thereof, it is to be understood that I do not limit myself to the specific embodiments thereof except as defined in the appended claims.

I claim:

1. A process for the production of ketones of a higher number of carbon atoms than the alcohols from which they are derived, which comprises passing a vapor of an alcohol selected from the group consisting of secondary methyl carbinols and secondary cyclic alcohols over a dehydrogenation catalyst capable of simultaneously hydrogenating olefin bonds at a temperature between 200 and 500° C., and at a rate of flow that will give a time of contact between the alcohol and catalyst of between 6 and 50 seconds.

2. A process for the production of ketones of a higher number of carbon atoms than the alcohols from which they are derived, which comprises passing a vapor of an alcohol selected from the group consisting of secondary methyl carbinols and secondary cyclic alcohols over a catalyst which contains at least one dehydrogenation catalyst combined with a dehydrating metal oxide at a temperature between 200 and 500° C., and at a rate of flow that will give a time of contact between the alcohol and catalyst of between 6 and 50 seconds.

3. A process for the production of ketones of a higher number of carbon atoms than the alcohols from which they are derived, which comprises passing a vapor of an alcohol selected from the group consisting of secondary methyl carbinols and secondary cyclic alcohols over a catalyst which contains a plurality of dehydrogenation catalysts combined with a dehydrating metal oxide at a temperature between 200 and 500° C., and at a rate of flow that will give a time of contact between the alcohol and catalyst of between 6 and 50 seconds.

4. A process for the production of ketones of a higher number of carbon atoms than the alcohols from which they are derived, which comprises passing a vapor of an alcohol selected from the group consisting of secondary methyl carbinols and secondary cyclic alcohols over a catalyst which contains a plurality of dehydrogenation catalysts combined with chromium oxide at a temperature between 325 and 500° C., and at a rate of flow which will give a time of contact between the alcohol and catalyst of between 6 and 50 seconds.

5. A process for the production of ketones of a higher number of carbon atoms than the alcohols from which they are derived, which comprises passing a vapor of an alcohol selected from the group consisting of secondary methyl carbinols and secondary cyclic alcohols over a catalyst consisting of a mixture of chromites of zinc, copper and cadmium, at a temperature of between 325 and 500° C., and at a rate of flow which will give a time of contact between the alcohol and catalyst of between 6 and 50 seconds.

6. A process for the production of ketones of a higher number of carbon atoms than the alcohols from which they are derived, which comprises passing a vapor of a secondary methyl carbinol over a dehydrogenation catalyst capable of simultaneously hydrogenating olefin bonds at a temperature between 200 and 500° C., and at a rate of flow which will give a time of contact between the alcohol and catalyst of between 6 and 20 seconds.

7. A process for the production of ketones of a higher number of carbon atoms than the alcohols from which they are derived, which comprises passing a vapor of a secondary methyl carbinol over a catalyst which contains at least one dehydrogenation catalyst combined with a dehydrating metal oxide at a temperature between 200 and 500° C., and at a rate of flow which will give a time of contact between the alcohol and catalyst of between 6 and 20 seconds.

8. A process for the production of ketones of a higher number of carbon atoms than the alcohols from which they are derived, which comprises passing a vapor of a secondary methyl carbinol over a catalyst which contains a plurality of dehydrogenation catalysts combined with a dehydrating metal oxide at a temperature between 200 and 500° C., and at a rate of flow that will give a time of contact between the alcohol and catalyst of between 6 and 20 seconds.

9. A process for the production of ketones of a higher number of carbon atoms than the alcohols from which they are derived, which comprises passing a vapor of a secondary methyl carbinol over a catalyst which contains a plurality of dehydrogenation catalysts combined with chromium oxide at a temperature between 325 and 500° C., and at a rate of flow which will give a time of contact between the alcohol and catalyst of between 6 and 20 seconds.

10. A process for the production of ketones of a higher number of carbon atoms than the alcohols from which they are derived, which comprises passing the vapor of a secondary cyclic alcohol over a dehydrogenation catalyst capable of simultaneously hydrogenating olefin bonds at a temperature between 200 and 500° C., and at a rate of flow that will give a time of contact between the alcohol and catalyst of between 20 and 40 seconds.

11. A process for the production of ketones of a higher number of carbon atoms than the alcohols from which they are derived, which comprises passing the vapor of a secondary cyclic alcohol over a catalyst which contains at least one dehydrogenation catalyst combined with a dehydrating metal oxide at a temperature between 200 and 500° C., and at a rate of flow that will give a time of contact between the alcohol and catalyst of between 20 and 40 seconds.

12. A process for the production of ketones of a higher number of carbon atoms than the alcohols from which they are derived, which comprises passing the vapor of a secondary cyclic alcohol over a catalyst which contains a plurality of dehydrogenation catalysts combined with a dehydrating metal oxide at a temperature between 200 and 500° C., and at a rate of flow that will give a time of contact between the alcohol and catalyst of between 20 and 40 seconds.

13. A process for the production of ketones of a higher number of carbon atoms than the alcohols from which they are derived, which comprises passing the vapor of a secondary cyclic alcohol over a catalyst which contains a plurality of dehydrogenation catalysts combined with chromium oxide at a temperature between 325 and 500° C. and at a rate of flow which will give a time of contact between alcohol and catalyst of 20 to 40 seconds.

14. A process for the production of ketones of a higher number of carbon atoms than the alcohols from which they are derived, which comprises passing a vapor of isopropanol over a dehydrogenation catalyst capable of simultaneously hydrogenating olefin bonds at a temperature of between 200 and 500° C., and at a rate of flow that will give a time of contact between the alcohol and catalyst of between 6 and 20 seconds.

15. A process for the production of ketones of a higher number of carbon atoms than the alcohols from which they are derived, which comprises passing a vapor of isopropanol over a catalyst which contains at least one dehydrogenation catalyst combined with a dehydrating metal oxide at a temperature between 200 and 500° C., and at a rate of flow which will give a time of contact between the alcohol and catalyst of between 6 and 20 seconds.

16. A process for the production of ketones of a higher number of carbon atoms than the alcohols from which they are derived, which comprises passing a vapor of isopropanol over a catalyst which contains a plurality of dehydrogenation catalysts combined with a dehydrating metal oxide at a temperature between 200 and 500° C., and at a rate of flow that will give a time of contact between the alcohol and catalyst of between 6 and 20 seconds.

17. A process for the production of ketones of a higher number of carbon atoms than the alcohols from which they are derived, which comprises passing a vapor of isopropanol over a catalyst which contains a plurality of dehydrogenation catalysts combined with chromium oxide at a temperature between 325 and 500° C., and at a rate of flow which will give a time of contact between the alcohol and catalyst of between 6 and 20 seconds.

18. A process for the production of ketones of a higher number of carbon atoms than the alcohols from which they are derived, which comprises vaporizing isopropanol, pre-heating the vapor to about 325–350° C., passing the pre-heated vapor over a catalyst consisting of a mixture of chromites of zinc, copper and cadmium, at a temperature of about 360° C. and at a rate of flow which will give a time of contact between the alcohol and catalyst of between 8 and 10 seconds, condensing and separating the ketones formed.

HERRICK R. ARNOLD.